United States Patent
Blanchard et al.

(10) Patent No.: US 12,190,251 B2
(45) Date of Patent: Jan. 7, 2025

(54) HYBRID MACHINE LEARNING

(71) Applicant: Alteryx, Inc., Irvine, CA (US)

(72) Inventors: Dylan Blanchard, Chicago, IL (US); Tyler Heinl, Denver, CO (US); Roland Manfred Hochmuth, Fort Collins, CO (US)

(73) Assignee: Alteryx, Inc., Irvine, CA (US)

( * ) Notice: Subject to any disclaimer, the term of this patent is extended or adjusted under 35 U.S.C. 154(b) by 1087 days.

(21) Appl. No.: 17/002,717

(22) Filed: Aug. 25, 2020

(65) Prior Publication Data
US 2022/0067541 A1   Mar. 3, 2022

(51) Int. Cl.
| | | |
|---|---|---|
| G06N 5/04 | (2023.01) | |
| G06F 16/9032 | (2019.01) | |
| G06F 16/9035 | (2019.01) | |
| G06F 18/21 | (2023.01) | |
| G06F 18/2113 | (2023.01) | |
| G06F 18/214 | (2023.01) | |
| G06F 18/22 | (2023.01) | |
| G06N 3/096 | (2023.01) | |

(Continued)

(52) U.S. Cl.
CPC ......... *G06N 5/04* (2013.01); *G06F 16/90328* (2019.01); *G06F 18/2113* (2023.01); *G06F 18/214* (2023.01); *G06F 18/2178* (2023.01); *G06F 18/22* (2023.01); *G06N 3/096* (2023.01); *G06N 3/0985* (2023.01); *G06N 3/10* (2013.01); *G06N 5/045* (2013.01); *G06N 20/00* (2019.01); *G06F 16/9035* (2019.01)

(58) Field of Classification Search
CPC .......... G06N 5/04; G06N 20/00; G06N 20/10; G06N 20/20; G06N 3/08; G06N 3/09; G06N 3/096; G06N 3/0985; G06N 3/10; G06N 3/105; G06N 5/045; G06F 16/90328; G06F 16/9035; G06F 18/2113; G06F 18/214; G06F 18/2178; G06F 18/22

See application file for complete search history.

(56) References Cited

U.S. PATENT DOCUMENTS

| | | |
|---|---|---|
| 2003/0126102 A1 | 7/2003 | Borthwick |
| 2014/0280191 A1 | 9/2014 | Cronin |

(Continued)

OTHER PUBLICATIONS

PCT International Search Report and Written Opinion, PCT Application No. PCT/US21/47334, Nov. 23, 2021, 17 pages.

(Continued)

*Primary Examiner* — Shane D Woolwine
(74) *Attorney, Agent, or Firm* — FIG. 1 Patents (57) ABSTRACT

A model is trained through a hybrid machine learning process. In the hybrid machine landing process, an automatic machine learning process is performed on a dataset to generate a model for making a prediction. The automatic machine learning process uses a pipeline to train the model and makes decisions in the steps of the pipeline. After the model is trained through the automatic machine learning process, a representation of the pipeline is generated and presented to a user in a user interface. The user interface allows the user to modify at least some decision made in the automatic machine learning process. One or more modifications are received from the user through the user interface and are used to refine the trained model. The refined model is deployed to make the prediction based on new data.

20 Claims, 6 Drawing Sheets

(51) Int. Cl.
  *G06N 3/0985*  (2023.01)
  *G06N 3/10*  (2006.01)
  *G06N 5/045*  (2023.01)
  *G06N 20/00*  (2019.01)

(56) References Cited

U.S. PATENT DOCUMENTS

| | | |
|---|---|---|
| 2015/0379429 A1 | 12/2015 | Lee et al. |
| 2017/0308800 A1 | 10/2017 | Cichon et al. |
| 2019/0384461 A1 | 12/2019 | Seif et al. |
| 2019/0384577 A1* | 12/2019 | Seif .......................... G06F 8/22 |
| 2021/0097444 A1* | 4/2021 | Bansal ..................... G06F 9/546 |

OTHER PUBLICATIONS

2021332209, "Foreign Notice of Acceptance", AU Application 2021332209, Jul. 4, 2024, 3 pages.

3189593, "Foreign Office Action", CA Application 3189593, Jun. 4, 2024, 5 pages.

21862565.5, "EP Search Report", EP Application No. 21862565.5, Oct. 11, 2024, 8 pages.

La Cava, William, et al., "Evaluating Recommender Systems for AI-Driven Biomedical Informatics", Institute for Biomedical Informatics, University of Pennsylvania, Apr. 7, 2020, 17 pages.

Nagarajah, Thiloshon, et al., "A Review on Automated Machine Learning (AutoML) Systems", 5th International Conference on Convergence in Technology (I2CT), IEEE, Mar. 2019, 6 pages.

\* cited by examiner

HYBRID MACHINE LEARNING

BACKGROUND

Field of Art

The described embodiments pertain in general to processing data streams, and in particular to using a hybrid machine learning technique to train models for making predictions based on the data streams.

Description of the Related Art

Automatic machine learning tools automate the process of applying machine learning to real-world problems. Currently, automatic machine learning tools cover the complete pipeline from receiving the raw dataset to creating the deployable machine learning model. These tools advantageously produce simple solutions and allow for fast and efficient creation of those solutions. However, automatic machine learning tools often produce solutions that are sub-optimal because they do not incorporate domain knowledge pertaining to the dataset. The tools provide little ability for data analysts who have understanding of the dataset to control or otherwise modify the machine learning process. Consequently, the models generated by currently available automatic machine learning tools are not as good as they could be at making predictions based on the data.

SUMMARY

The above and other issues are addressed by a method, computer-implemented data analytics system, and computer-readable memory for processing data blocks in a data analytics system. An embodiment of the method includes receiving a dataset. The method further includes performing an automatic machine learning process on the received dataset to generate a model for making a prediction based on new data. The automatic machine learning process comprise making a sequence of decisions based on a machine learning pipeline. The method further includes after the trained model is generated, generating a representation of the machine learning pipeline. The method further includes providing the representation of the machine learning pipeline for display in a user interface. The user interface allows a user to modify at least some of the decisions made in the automatic machine learning process. The method further includes receiving one or more modifications from the user through the user interface. The method also includes refining the model based on the one or more modifications from the user. The refined model is to be used to make the prediction based on new data.

An embodiment of the computer-implemented data analytics system includes a computer processor for executing computer program instructions. The system also includes a non-transitory computer-readable memory storing computer program instructions executable by the computer processor to perform operations. The operations include receiving a dataset. The operations further include performing an automatic machine learning process on the received dataset to generate a model for making a prediction based on new data. The automatic machine learning process comprise making a sequence of decisions based on a machine learning pipeline. The operations further include after the trained model is generated, generating a representation of the machine learning pipeline. The operations further include providing the representation of the machine learning pipeline for display in a user interface. The user interface allows a user to modify at least some of the decisions made in the automatic machine learning process. The operations further include receiving one or more modifications from the user through the user interface. The operations also include refining the model based on the one or more modifications from the user. The refined model is to be used to make the prediction based on new data.

An embodiment of the non-transitory computer-readable memory stores executable computer program instructions. The instructions are executable to perform operations. The operations include receiving a dataset. The operations further include performing an automatic machine learning process on the received dataset to generate a model for making a prediction based on new data. The automatic machine learning process comprise making a sequence of decisions based on a machine learning pipeline. The operations further include after the trained model is generated, generating a representation of the machine learning pipeline. The operations further include providing the representation of the machine learning pipeline for display in a user interface. The user interface allows a user to modify at least some of the decisions made in the automatic machine learning process. The operations further include receiving one or more modifications from the user through the user interface. The operations also include refining the model based on the one or more modifications from the user. The refined model is to be used to make the prediction based on new data.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
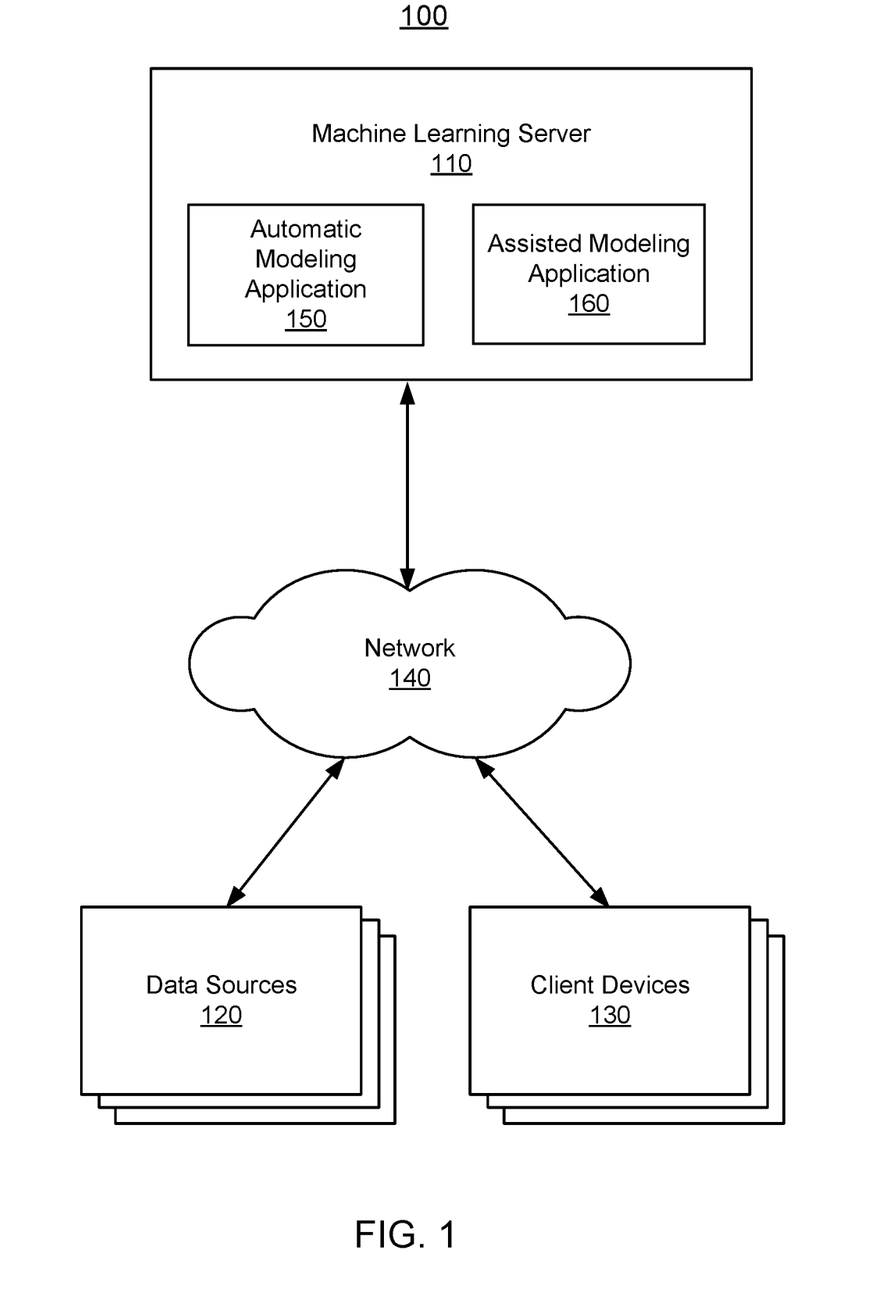
FIG. 1 is a block diagram illustrating a machine learning environment including a machine learning server according to one embodiment.

FIG. 1 is a block diagram illustrating a machine learning environment 100 including a machine learning server 110 according to one embodiment. The environment 100 further includes multiple data sources 120 and client devices 130 connected to the machine learning server 110 via a network 140. Although the illustrated environment 100 contains only one machine learning server 110 coupled to multiple data sources 120 and client devices 130, embodiments can have multiple machine learning servers, a singular data source, and a singular client device, or other variations thereof.

The machine learning server 110 is a computer-based system utilized for constructing machine learning models and deploying the models to make predictions based on data. Example predictions include whether or not a customer will make a transaction within a time period, whether or not a transaction is fraudulent, whether or not a user will perform a computer-based interaction, etc. The data are collected, gathered, or otherwise accessed from one or more of the multiple data sources 120 or one or more of the multiple client devices 130 via the network 140. The machine learning server 110 can implement scalable software tools and hardware resources employed in accessing, preparing, blending, and analyzing data from a wide variety of data sources 120 or client devices 130.

In some embodiments, the machine learning server 110 is a computer system that implements hybrid machine learning. The machine learning server 110 includes an automatic modeling application 150 and an assisted modeling application 160. The automatic modeling application 150 performs an automatic machine learning process on a dataset to train a model. In contrast, the assisted modeling application 160 performs an assisted machine learning process using both a dataset and user input to train a model. The user input specifies how the assisted modeling application 160 processes the dataset to train the model. For example, the user input may select a data type, data imputation method, feature, or algorithm, tune a hyperparameter, provide other guidance to the machine learning process, or some combination thereof.

The two applications may run separately or together to train models. When the two applications run together, they train a model through a hybrid machine learning process in which the assisted modeling application 160 is used to constrain or otherwise refine the model generated by the automatic modeling application 150.

In embodiments where the hybrid machine learning process starts with the automatic machine learning process, the automatic modeling application 150 follows a machine learning pipeline (also referred to as "pipeline") to perform the automatic machine learning process and generate a model. The pipeline is a workflow of the automatic machine learning process and specifies a sequence of steps to train the model. In one example, the steps in the pipeline include data preparation, feature engineering, model training, model validation, and model deployment. A step may include sub-steps. For instance, the step of data preparation may include data type setting, data encoding, and data imputation, the step of feature engineering may include feature selection and feature ranking, and the step of model training may include hyperparameters tuning and algorithm selection. In some embodiments, the pipeline includes steps in a different order and/or more, fewer, or different steps than those described herein. The pipeline can either be created by a user or by the automatic modeling application 150.

The automatic modeling application 150 makes a sequence of decisions as it performs the steps of the pipeline. The automatic modeling application 150 may make one or more decisions in each step. In some embodiments, the automatic modeling application 150 iteratively processes some steps of the pipeline to optimize one or more decisions made in these steps. The automatic modeling application 150 may address the steps of the pipeline out of order. For instance, the automatic modeling application 150 may select features before it sets data types for the features. The automatic modeling application 150 may revisit a step after it addresses a subsequent step to optimize the initial decision made in the step. For instance, the automatic modeling application 150 may first select a data type for a variable, then extract a feature from the variable, and then go back to change the data type for the variable.

After the trained model is generated, the hybrid machine learning process moves to the assisted machine learning process. The assisted modeling application 160 generates a representation of the machine learning pipeline used by the automatic modeling application 150, e.g., by extracting optimizations and decisions made by the automatic modeling application 150 from the automatic machine learning process. The representation of the machine learning pipeline may include representations of some or all steps in the pipeline. A representation of a step includes the decision made by the automatic modeling application 150 during the automatic machine learning process as well as alternative options for the step. The decision and alternative options are referred to together as "options" hereinafter. The representation of the step may include other information, such as a recommendation score for each option that indicates a level of recommendation for the option, a description of the option that can help the user to make a modification, and so on. In some embodiments, the recommendation score is determined by the automatic modeling application 150 in the automatic machine learning process, and the assisted modeling application 160 derives the recommendation score from the automatic machine learning process. In some embodiments, the assisted modeling application 160 determines the recommendation score based on the automatic machine learning process.

The assisted modeling application 160 provides the representation of the pipeline for display to the user, e.g., in a GUI. The user may review the steps in the pipeline and/or modify the decisions made in the automatic machine learning process. The assisted modeling application 160 receives modifications from the user and can refine the trained model based on the modifications. The refined trained model is then deployed to make predictions based on new data.

In some embodiments, the hybrid machine learning process starts with the assisted machine learning process. The assisted modeling application 160 receives user input and creates a set of pipelines based on the user input. For instance, the assisted modeling application 160 may present recommendations (e.g., recommendations of data type, transformer, feature, algorithm, and/or hyperparameter) in a user interface and the user provides the user input based on the recommendations through the user interface. The assisted modeling application 160 sends the set of pipelines to the automatic modeling application 150 and the automatic modeling application 150 performs the automatic machine learning process based on the set of pipelines. Compared with a pure automatic machine learning process, the hybrid machine learning process consumes less time and/or computing resources as the automatic modeling application 150 can limit its search/optimization to the set of pipelines. Also, by using the user input to create the set of pipelines, it takes advantages of the user's domain knowledge that the automatic modeling application 150 usually does not have.

The data sources 120 provide electronic data to the machine learning server 110. A data source 120 may be a storage device such as a hard disk drive (HDD) or solid-state drive (SSD), a computer managing and providing access to multiple storage devices, a storage area network (SAN), a database, or a cloud storage system. A data source 120 may also be a computer system that can retrieve data from another source. The data sources 120 may be remote from the machine learning server 110 and provide the data via the network 140. In addition, some or all data sources 120 may be directly coupled to the data analytics system and provide the data without passing the data through the network 140.

The data provided by the data sources 120 may be organized into data records (e.g., rows). Each data record includes one or more values. For example, a data record provided by a data source 120 may include a series of comma-separated values. The data describe information of relevance to an enterprise using the machine learning server 110. For example, data from a data source 120 can describe computer-based interactions (e.g., click tracking data) with content accessible on websites and/or with applications. As another example, data from a data source 120 can describe customer transactions online and/or in stores. The enterprise can be in one or more of various industries, such as manufacturing, sales, financing, and banking.

The client devices 130 are one or more computing devices capable of receiving user input as well as transmitting and/or receiving data via the network 140. In one embodiment, a client device 130 is a conventional computer system, such as a desktop or a laptop computer. Alternatively, a client device 130 may be a device having computer functionality, such as a personal digital assistant (PDA), a mobile telephone, a smartphone, or another suitable device. The client devices 130 are configured to communicate with one or more data sources 120 and the machine learning server 110 via the network 140. In one embodiment, a client device 130 executes an application allowing a user of the client device 130 to interact with the machine learning server 110. For example, a client device 130 executes an application to enable interaction between the client device 130 and the machine learning server 110 via the network 140, e.g., through by running a GUI supported by the machine learning server 110. The client device 130 includes or is otherwise associated with a display device that displays the GUI. The client device 130 is also associated with input devices, e.g., keyboard, mouse, etc., that allow the user to interact with the GUI, such as provide inputs to the GUI. In another embodiment, a client device 130 interacts with the machine learning server 110 through an application programming interface (API) running on a native operating system of the client device 130, such as IOS® or ANDROID™. The client device 130 may interact with one or more data sources 120 to transmit data to a data source 120 or obtain data from a data source 120.

The network 140 represents the communication pathways between the machine learning server 110 and data sources 120. In one embodiment, the network 140 is the Internet and uses standard communications technologies and/or protocols. Thus, the network 140 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 140 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
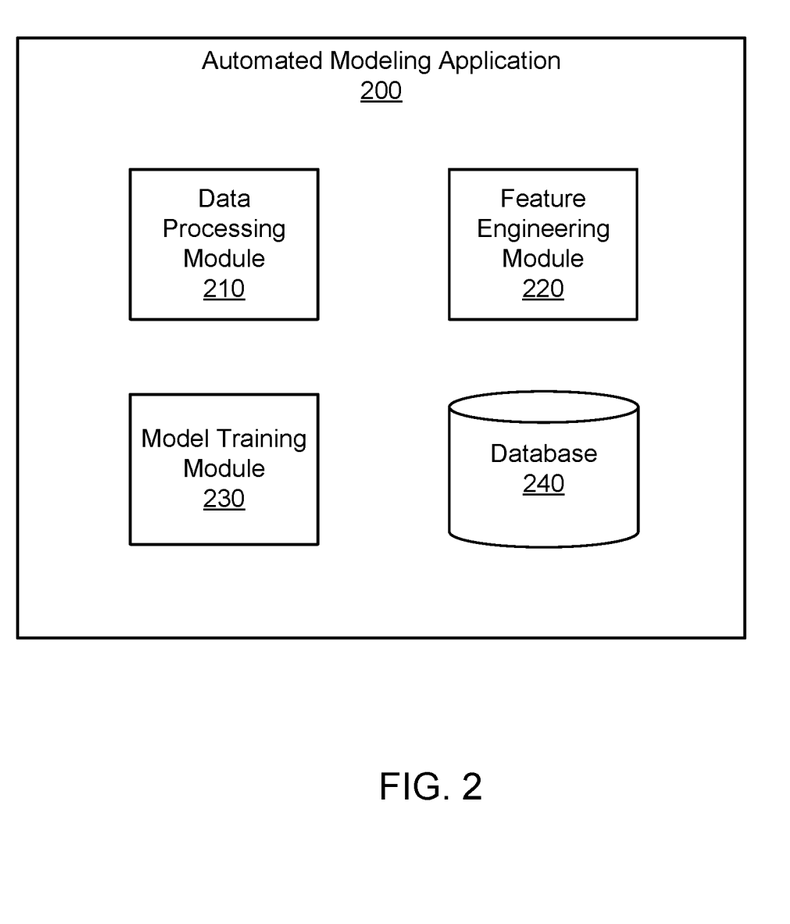
FIG. 2 is a block diagram illustrating an automatic modeling application according to one embodiment.

FIG. 2 is a block diagram illustrating an automatic modeling application 200 according to one embodiment. The automatic modeling application 200 is an embodiment of the automatic modeling application 150 in FIG. 1. The automatic modeling application 200 uses a pipeline to perform an automatic machine learning process on a dataset to train a model. The trained model is to be used for predicting a target variable that may be defined by a user. The automatic modeling application 200 includes a data preparing module 210, a feature engineering module 220, a model training module 230, and a database 240. Those of skill in the art will recognize that other embodiments can have different and/or other components than the ones described here, and that the functionalities can be distributed among the components in a different manner. The components of the automatic modeling application 200 operate together to perform the automatic machine learning process by making a sequence of decisions in the steps of the pipeline.

The data preparing module 210 processes data in the dataset to prepare a training dataset for training the model. The data preparing module 210 determines data types for variables associated within the dataset. A variable associated with the dataset can be a variable in the dataset or be transformed from one or more variables in the dataset. In some embodiments, the variable associated with the dataset is a predicting variable, i.e., a feature. In some embodiments, the data preparing module 210 selects the data type of a variable from a pool of optional data types, such as whether the variable is numerical data type, categorical data type, time series data type, zip code data type, or textual data type. In some embodiments, the data preparing module 210 determines the one or more data types for a variable through a rule-based analysis. The determination is based on rules maintained by the data preparing module 210. In one example, the rules specify which data type for a variable based on data values of the variable, e.g., variables including numerical values have the numerical data type and variable including textual values have the textual data type. If the data preparing module 210 determines that a variable is numeric, it may further determine whether the variable is integer or float under the rule. If it is integer, the data preparing module 210 may then determine the number of unique integer values of the variable. If the data preparing module 210 determines that the number of unique integer values of the variable is below a threshold, the rule indicates that the data type of the variable is categorical. The rule may also suggest that the datatype of the variable could be numerical. In another example, the rules specify which data type for a variable based on a description of the variable, e.g., a variable named "user ID" in the dataset has the ID data type and a variable named "date of birth" has the time series data type.

The data preparing module 210 may determine a ranking score for each optional data type of a variable. The ranking score of a data type indicates a probability of the optional data type being the true data type of the variable. In some embodiments, the rules maintained by the data preparing module 210 may indicate probabilities of different data types for a variable. In the example discussed above, if the data preparing module 210 determines that the number of unique integer values of the variable is below a threshold, the rule can indicate that the categorical data type has the higher probability than the numerical data type. The data preparing module 210 may also determine whether the integer values are zip codes and determine a probability for zip code based on the rule. In another example, the rule indicates that for a variable named "zip code" in the dataset, the probabilities for categorical data type and numerical data type are higher than the probability for time series data type and textual data type. In yet another example, the rule indicates that for a variable including textual values, the probabilities for categorical data type and textual data type are higher than the probability for time series data type and numerical data type.

In some embodiments, the data preparing module 210 may determine the ranking score of each optional data type by evaluating performance of a model trained using the data type. For instance, the data preparing module 210 trains a model using an optional data types and determines the ranking scores of the optional data type based on the performance of the model. The data preparing module 210 may compare performances of models trained using different data types (other decisions in the machine learning processes of the models can be the same) and determine ranking scores of the data types based on the comparison. For instance, the data preparing module 210 determines that the ranking score of a data type is higher than another data type if the model trained using the data type shows better performance than the model trained using the other data type. The ranking scores/probabilities can be used to constrain further search done by the automatic modeling application 200 in the automatic machine learning process, such as search for features, algorithms, hyperparameters, etc.

The data preparing module 210 selects one of the four data types as the data type of the variable based on the ranking scores. For instance, the data preparing module 210 selects the data type that has the highest probability.

The data preparing module 210 may encode data in the dataset based on the determined data types. Values of some data types, e.g., categorical values, are encoded into different representations that are better suited to model training. In some embodiments, the data preparing module 210 encodes the values of categorical variables, time series variables, and/or textual variables to convert the values to binary values. The data preparing module 210 may encode the date using various methods, such as translating text to numerical values, label encoding, one hot encoding, custom binary encoding, backward difference encoding, polynomial encoding, and so on.

The data preparing module 210 detects missing values in the dataset and performs data imputation to supply the values. In some embodiments, the data preparing module 210 determines new values based on the present values in the dataset to replace the missing values. For instance, for each column that has missing values, the data preparing module 210 replaces the missing values in the column with the mean or median of the present values in the column, with the most frequent values in the column, or with values from new samples not in the dataset. The data preparing module 210 may use other imputation methods, such as k-Nearest Neighbor (kNN) imputation, hot deck imputation, cold deck imputation, regression imputation, Stochastic regression imputation, extrapolation and interpolation, single imputation, multiple imputation, Multivariate Imputation by Chained Equation (MICE), imputation using Deep Neural Networks, and so on. The data preparing module 210 may identify multiple imputation methods and rank the identified imputation methods based on the data type of the corresponding variable. In one example, for a numeric variable, the data preparing module 210 determines if there are outliers in the dataset, and if there are, it ranks the imputation method of median higher than the imputation method of mean.

The feature engineering module 220 extracts features from the dataset. The feature engineering module 220 may extract a variable in the dataset as a feature and/or use a transformer to convert a variable in the dataset to a feature. When the transformer is applied to the values of the variable, it generates values of the feature. In some embodiments, the feature engineering module 220 selects the transformers from a pool of model training module 230 transformers based on one or more factors, such as variables in the dataset, the target variable, business problem related to the target variable, and so on.

The feature engineering module 220 ranks the features and determines a ranking score for each feature. The ranking score of a feature indicates how important the feature is for predicting the target variable, in other words, how good the feature is as a predictor. In some embodiments, the feature engineering module 220 constructs a random forest based on the features and the dataset. The feature engineering module 220 determines a ranking score of a feature based on each decision tree in the random forest and obtains an average of the individual ranking scores as the ranking score of the feature. The feature engineering module 220 may use GINI impurity as part of each decision tree to measure how much a feature contributes to the whole predictive model. The ranking score of a feature determined by using the random forest indicates how important the feature is relative to the other features and are referred to as "relative ranking score." In one example, the ranking module 330 determines that the relative ranking scores of the highest ranked selected feature is 1. The ranking module 330 then determines a ratio of the ranking score of each of the rest of the features to the ranking score of the highest ranked feature as the relative ranking scores of the corresponding selected feature.

The feature engineering module 220 may determine absolute ranking score for each selected feature, e.g., based on Goodman-Kruskal Tau (GKT) measure. GKT measure is a measure of association that is local or absolute and indicates how well a feature predicts a target. The feature engineering module 220 may select a subset of the group of features based on their relative ranking scores and/or absolute ranking scores as features to train the model.

The model training module 230 trains the model based on the features and their ranking scores as determined by the feature engineering module 220. In some embodiments, the model training module 230 selects an algorithm (also referred to as an "estimator") from a pool of candidate algorithms. Examples of a candidate algorithms include, e.g., decision tree, logistic regression, random forest, XGBoost, linear support vector machine (linear SVM), AdaBoost, neural networks, naïve Bayes, memory-based learning, random forests, bagged trees, boosted trees, boosted stumps, and so on. The model training module 230 trains the model by using the selected algorithm. In some embodiments, the model training module 230 may constrain the number of candidate algorithms in the pool based on available information, e.g., time limit for training the model, computational resource limitations (e.g., processor limitations, memory usage limitations, etc.), the predictive problem to be solved, characteristics of the dataset, selected features, and so on. The model training module 230 may test each candidate algorithm and select the best one. The model training module 230 can define a testing harness associated with a performance measure (e.g., classification accuracy) to assess performance of the candidate algorithms. For example, the model training module 230 applies a model trained with a candidate algorithm to a validation dataset (a different dataset from the dataset used to train the model) to quantify the accuracy of the trained model. Common metrics applied in accuracy measurement include: Precision=TP/(TP+FP) and Recall=TP/(TP+FN), where precision is how many outcomes the model correctly predicted (TP or true positives) out of the total it predicted (TP+FP or false positives), and recall is how many outcomes the model correctly predicted (TP) out of the total number that actually occurred (TP+FN or false negatives). The F score (F-score=2*PR/(P+R)) unifies precision and recall into a single measure.

The outcome of testing the candidate algorithms against the testing harness estimates how the candidate algorithms perform on the predictive problem against the performance measures. The model training module 230 selects the candidate algorithm that has the best performance. In some embodiments, the model training module 230 further optimizes the selected candidate algorithm. The model training module 230 may analyze pros and cons of the candidate algorithms based on the testing outcome or other information of the candidate algorithms.

The model training module 230 may also determine hyperparameters required by the selected algorithm. A hyperparameter is a parameter whose value is used to control the machine learning process. The hyperparameters are used in the training process and may influence the speed or quality of the training process. Examples of hyperparameters include learning rate, mini-batch size, C and sigma hyperparameters for support vector machines, size of a neural network, and the topology of a neural network. The model training module 230 can determine a hyperparameter by grid searching, random searching, or other methods. In some embodiments, the model training module 230 obtain the hyperparameters by deriving one or more hyperparameters from historical training processes, using default values specified for automatic machine learning, or other techniques. The database 240 stores data associated with the automatic modeling application 200, such as data received, used, and generated by the automatic modeling application 200. For instance, the database 240 stores the dataset, pipeline, decisions made in the steps of the pipeline, training data set, features, transformers, algorithms, hyperparameters, trained model, and so on.

Figure 3:
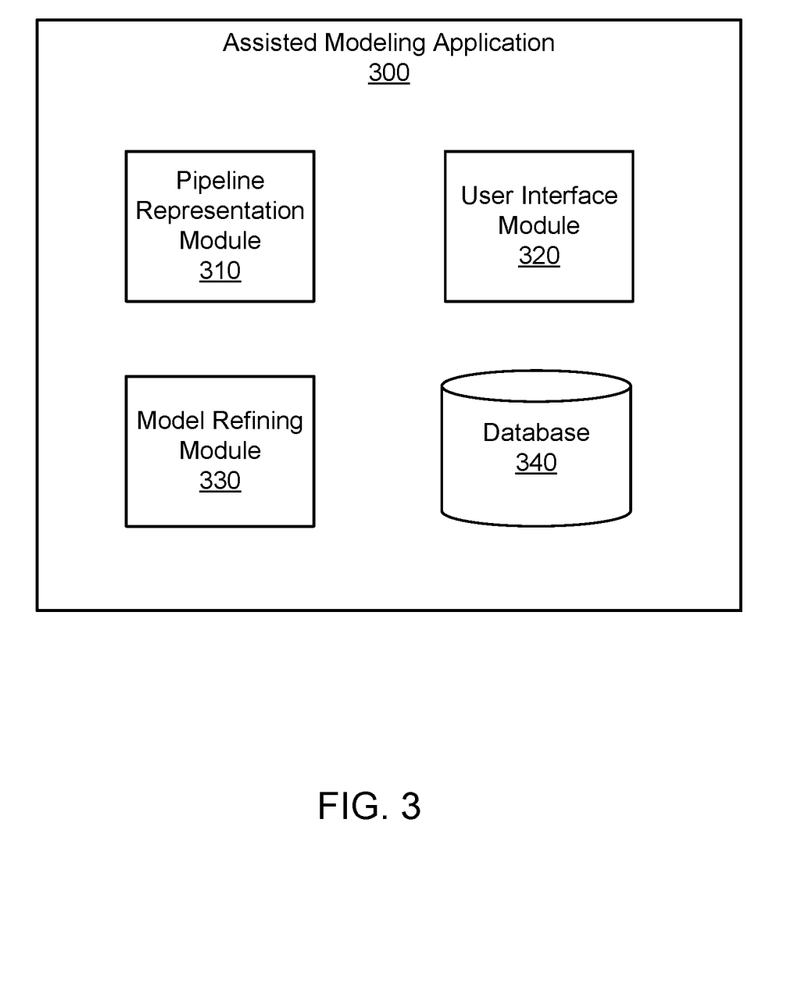
FIG. 3 is a block diagram illustrating an assisted modeling application according to one embodiment.

FIG. 3 is a block diagram illustrating an assisted modeling application 300 according to one embodiment. The assisted modeling application 300 is an embodiment of the assisted modeling application 160 in FIG. 1. The assisted modeling application 300 refines a model trained by the automatic modeling application 200 based on user input. The assisted modeling application 300 includes a pipeline representation module 310, a user interface module 320, a model refining module 330, and a database 340. Those of skill in the art will recognize that other embodiments can have different and/or other components than the ones described here, and that the functionalities can be distributed among the components in a different manner.

The pipeline representation module 310 generates a representation of a machine learning pipeline. In some embodiments, the pipeline representation module 310 obtains the machine learning pipeline from an automatic modeling application, such as the automatic modeling application 150. For instance, the pipeline representation module 310 retrieves the machine learning pipeline from an automatic machine learning process performed by the automatic modeling application. In some embodiments, the pipeline representation module 310 retrieves data stored in the database 240 of the automatic modeling application 200, such as data used and generated in the automatic machine learning process. The pipeline representation module 310 analyzes the data and maps the data into the steps of the pipeline and options in each step. The pipeline representation module 310 generates the representation of the pipeline based on the analysis and mapping. In some embodiments, the pipeline representation module 310 queries the automatic modeling application 200 for more than one pipelines. For instance, the pipeline representation module 310 queries for a predetermined number of pipelines identified by the automatic modeling application 200. In response to the query, the automatic modeling application 200 sends the predetermined number of best pipelines in its search to the pipeline representation module 310. The pipeline representation module 310 can select one of the pipelines received from the automatic modeling application 200 based on performance measurement of models trained using the pipelines, such as model accuracy. The pipeline representation module 310 then translates the selected pipeline and steps/components of the pipeline to generate the representation of the pipeline.

The pipeline representation module 310 generates a representation for one or more steps in the pipeline. The representation of a step (also referred to as "step representation") includes options for the step. One of the options is the decision made in the step during the automatic machine learning process. The representation may also include a ranking score or recommendation indicator for each option. The ranking score or recommendation indicator indicates the level of recommendation for the option. For some steps, the representation includes a description of each option. The description includes, e.g., explanation of the function of the option, assessment (e.g., pros and cons) of the option, evaluation of the option, description of reasons for choosing and/or not choosing the option, and so on. The ranking scores and/or descriptions can be either determined by the automatic model application 200 or by the pipeline representation module 310, e.g., by using the techniques described above in conjunction with FIG. 2. In some embodiments, the ranking score and/or description of an option is determined based on a performance measure (e.g., prediction accuracy) of a model trained using the option. For instance, the recommendation score of an option is higher when the performance of the model trained using the option is determined to be better.

In one example, the pipeline representation module 310 generates a data type list as a representation of the data type setting step. The data type list is associated with one or more variables, e.g., features used in the automatic machine learning process. It includes a plurality of optional data types for each feature. The data type list also includes a ranking score for each optional data type. The ranking score indicates a probability that the optional data type is the true data type of the feature.

In another example, the pipeline representation module 310 generates a data imputation list as a representation of the data imputation step. The data imputation list includes one or more features having missing values that were imputed in the automatic machine learning process. For each feature, the data imputation list includes a number of optional imputation methods, which includes the imputation method used in the automatic machine learning process to impute the value of the feature. The data imputation list may include a percentage for each feature indicating the percentage of rows with missing values in the total rows of the feature. The pipeline representation module 310 may calculate replacing values based on each optional imputation method and include replacing values in the representation of the data imputation step.

In yet another example, the pipeline representation module 310 generates a feature list as a representation of the feature engineering step. The feature list includes some or all of the features used in the automatic machine learning process and may also include features that were not used in the automatic machine learning process. The feature list may include a ranking score of each feature that indicates how important the feature is for the prediction, a description of each feature, an evaluation of the feature, or some combination thereof. The feature list may also include transformers used for extracting features.

In yet another example, the pipeline representation module 310 generates an algorithm list as a representation of the algorithm selecting step. The algorithm list includes optional algorithms used for training models. One of the optional algorithms is the algorithm selected and used in the automatic machine learning process and the pipeline representation module 310 may label it as "recommended" algorithm in the algorithm list. For each optional algorithm, the algorithm list may include a description showing pros and cons of the optional algorithm. The pros and cons can be specific to the model to be refined. The pipeline representation module 310 may also determine a ranking score for each optional algorithm, e.g., based on the testing outcome of the performance of the optional algorithm in the automatic machine learning process. In one example, the pipeline representation module 310 determines the ranking score based on the measured accuracy of a model trained using the optional algorithm.

The user interface module 320 supports a GUI and provides the representation of the pipeline for presentation through the GUI. The GUI allows the user to view the representation of the pipeline, review the decisions made in the automatic machine learning process based on the pipeline, and make modifications to at least some of the decisions. In one example, the GUI allows the user to change the data type of a variable used in the automatic machine learning process to a different data type. In another example, the GUI allows the user to edit features, such as change transformers, remove a feature that was selected in the automatic machine learning process, add a feature not selected in the automatic machine learning process, or change the ranking of a feature that was determined in the automatic machine learning process. For instance, the user can use his/her domain knowledge to remove a feature that results in target leakage but was selected in the automatic machine learning process due to the lack of the domain knowledge of the automatic modeling application 200. The GUI may also allow the user to change algorithm and/or hyperparameter.

In some embodiments, the GUI includes a plurality of control elements with which the user can interact to select and modify a step of the pipeline. Examples of the control elements include checkboxes, buttons, tabs, icons, dropdown lists, list boxes, radio buttons, toggles, text fields, date field. For instance, the GUI includes a tab for each step and the user can click the tab to access the decision and alternative options for the step. The options in each step may be presented in a dropdown list or checkboxes that allow the user to select one or more options at a time. The decision for the corresponding step may be distinguished from the alternative options, e.g., the decision may be marked as "recommended" in the GUI or may be highlighted. The GUI allows a user to either keep the decision (e.g., by doing nothing or by clicking an icon representing the decision) or choose an alternative option (e.g., by clicking an icon representing the alternative option).

In some embodiments, the GUI allows the user to navigate the steps in the pipeline out of order. For instance, the user may review the selecting feature step before the user reviews the setting data type step. The GUI may allow the user to revisit a step and/or make multiple modifications to a step.

The GUI may allow other types of user input. For instance, the GUI allows the user to modify the target variable, edit the dataset, select automation level for refining the model, and so on.

The model refining module 330 refines the trained model based on modifications received from the user through the GUI. In some embodiments, the model refining module 330 sends the modifications to the automatic modeling application 200 and the automatic modeling application 200 tunes part or all of the automatic machine learning process with the modifications. The automatic modeling application 200 may update its decisions in the pipeline based on the modifications and trains a new model based on the updated decisions. For instance, the automatic modeling application 200 uses the user's modification to constrain its search for candidate algorithms or hyperparameters. In one example, the GUI receives the user's specification of one or more hyperparameters to be used to refine the model, the model refining module 330 sends the one or more hyperparameters to the automatic modeling application 200 and the automatic modeling application 200 uses the one or more hyperparameters to search for new pipeline and algorithm. The automatic modeling application 200 then uses the new pipeline and algorithm to re-train the model.

In some embodiments, the model refining module 330 re-trains the model based on the user's modifications, e.g., by using the machine learning techniques described above in conjunction with FIG. 2. The model refining module 330 may perform part or all of the pipeline to refine the trained model, which involves in making similar decisions as the automatic machine learning process or making new decisions. For instance, after receiving a user's modification of a data type of a feature from numerical to categorical, the model refining module 330 makes a new decision by selecting a data encoding method to convert the categorical values of the feature to numerical features. The model refining module 330 may also validate the refined model and deploy the refined model for making predictions based on new data after the validation.

The database 340 stores data associated with the assisted modeling application 300, such as data received, used, and generated by the assisted modeling application 300. For instance, the database 240 stores the representation of the pipeline, data from the automatic modeling application 200, data for the GUI, user input, data associated with refining the model, and so on.

Figure 4:
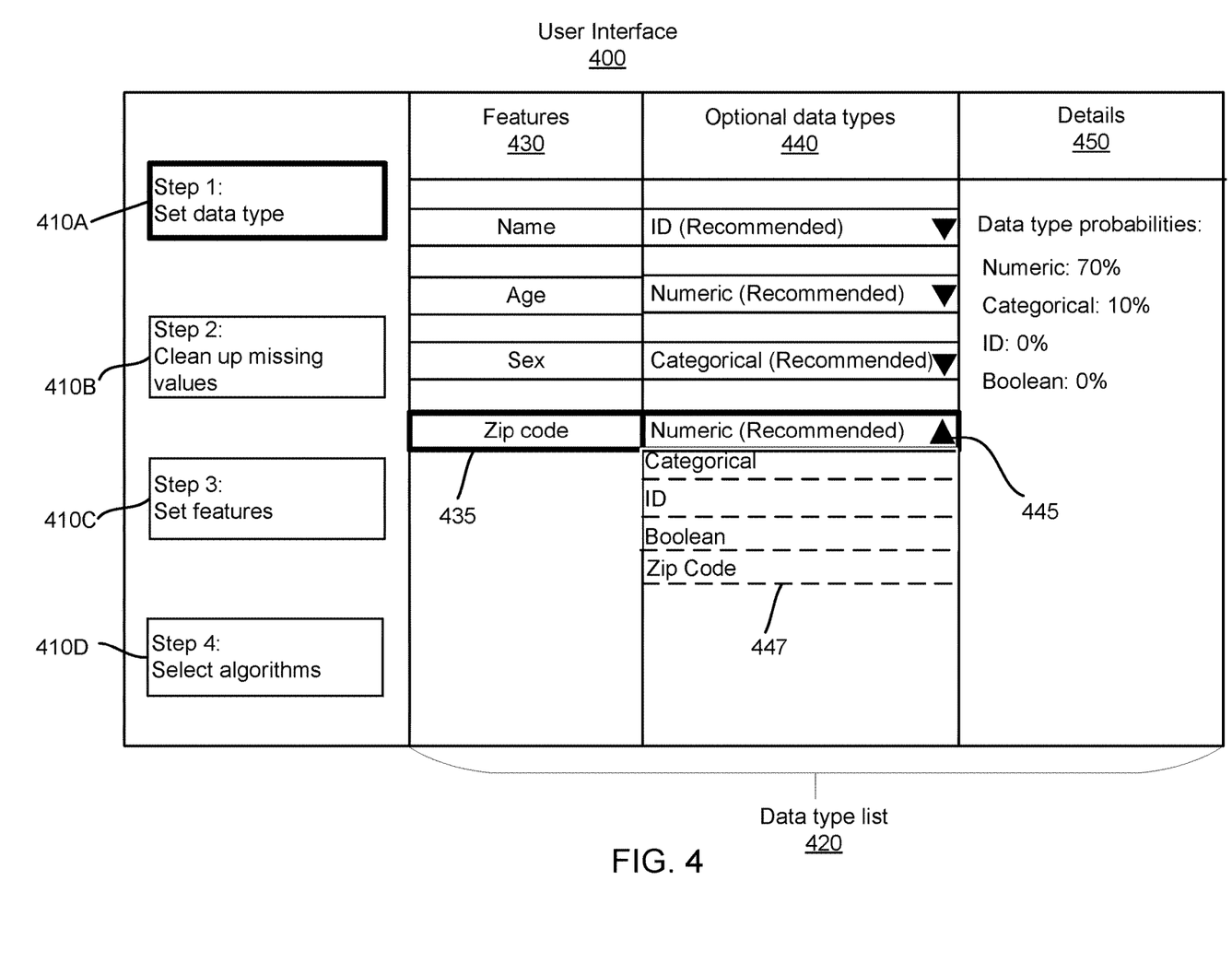
FIG. 4 is an example user interface for hybrid machine learning according to one embodiment.

FIG. 4 is an example user interface 400 for hybrid machine learning according to one embodiment. The user interface 400 is an embodiment of the GUI generated by the assisted modeling application 300 as described above. The user interface 400 presents a representation of a pipeline. It includes representations of four steps in the pipeline and four tabs 410A-D (collectively referred to as "tabs 410"). The user interface 400 allows a user to click one of the four tabs 410 to choose and navigate the corresponding step. As illustrated in FIG. 4, step 1 is chosen by the user. Step 1 is about setting data type. In response to receiving the user's click of the tab 410A for step 1, the user interface presents a data type list 420 to the user. The data type list 420 includes a list of features 430, optional data types 440 for the features, and details 450. The user interface has a tab 435 for each feature so that it allows the user to choose a feature by clicking the tab. The user interface also has a triangle button 445 and a drop list 447 for the optional data types of each feature. The default data type presented in the drop list 447 is the data type used in the automatic machine learning process and is marked as "recommended." In response to the user clicking the triangle button 445, the user interface presents other optional data types in the drop list. As illustrated in FIG. 3, the user chooses the zip code feature and the recommendation data type is numeric. After the user clicks the triangle button 445, the user interface presents three other data types to the user and allows the user to select one of the three to replace the recommended data type. In FIG. 4, the recommended data type for the zip code feature was mistakenly identified in the automatic machine learning process, but the user has a chance to review and correct the mistake. The user can change the data type of the zip code feature to zip code by choosing zip code in the drop list 447.

The user interface also presents further details 450 of the data types. The details include probabilities, each of which corresponds to an optional data type and indicates how likely the data type of the feature is the corresponding optional data type.

Even though not shown in FIG. 4, the user interface 400 presents different information as the user switches to a different step or make a different input to the user interface. For instance, after receiving the user's click of tab 401C, the user interface presents optional features and/or transformers to the user. As another example, after receiving the user's selection of an imputation method, the user interface presents replacing values calculated by using the imputation method to the user and the replacing values change as the user selects a different imputation method. Also, the user interface 400 may present representations of other pipeline steps.

Figure 5:
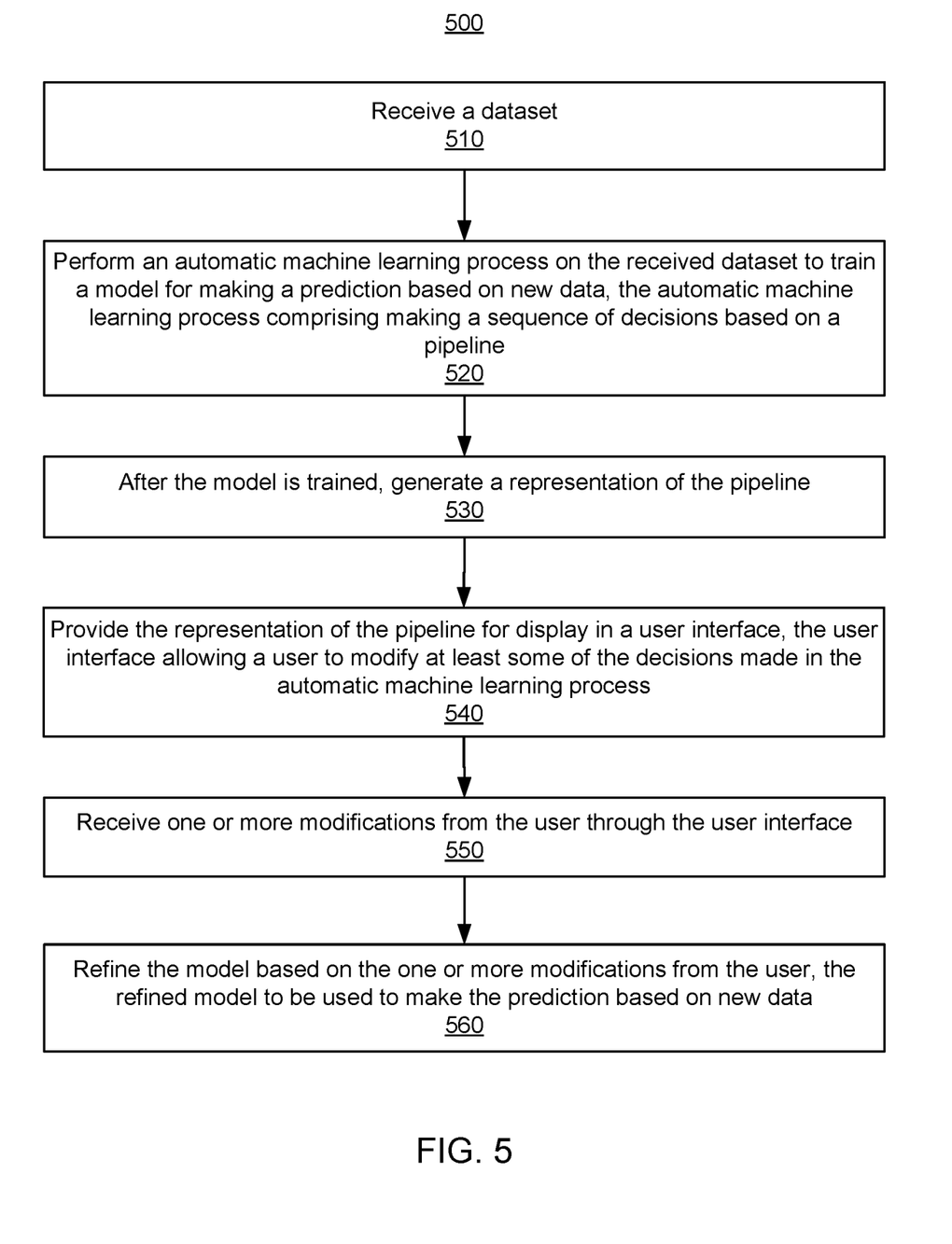
FIG. 5 is a flow chart illustrating a hybrid machine learning process according to one embodiment.

FIG. 5 is a flow chart illustrating a hybrid machine learning model process 500 according to one embodiment. In some embodiments, the method is performed by the machine learning server 110, although some or all of the operations in the method may be performed by other entities in other embodiments. In some embodiments, the operations in the flow chart are performed in different orders and include different and/or additional steps.

The machine learning server 110 receives 510 a dataset. In some embodiments, the machine learning server 110 receives the dataset from a data source (e.g., a data source 120) that is associated with an enterprise. The enterprise can be in one or more of various industries, such as manufacturing, sales, financing, and banking. In some embodiments, the machine learning server 110 receives the dataset from a client device, such as a client device 130.

The machine learning server 110 performs 520 an automatic machine learning process on the received dataset to train a model for making a prediction based on new data. The automatic machine learning process includes making a sequence of decisions based on a pipeline. In some embodiments, the pipeline includes a sequence of steps, such as data type setting, data encoding, data imputation, feature selection, feature ranking, algorithm selection, hyperparameters tuning, model training, and model validation. In some other embodiments, the pipeline may include fewer, more, or different steps. Each of the sequence of decisions is made in a step in the pipeline.

After the trained model is generated, the machine learning server 110 generates 530 a representation of the pipeline. The machine learning server 110 may identify some or all of the steps in the pipeline and generates a representation of each identified step. The representation of a step includes a plurality of options for the step that include the decision made in the step during the automatic machine learning process. The representation of the step may also include a ranking score for each of the plurality of options that indicates a level of recommendation for the option or other information of each option, such as assessment, description, and so on.

In some embodiments, the machine learning server 110 generates a data type list that includes a feature used in the automatic machine learning process to train the model, a plurality of optional data types for the features, and a ranking score for each optional data type that indicates a probability that the data type being a true data type of the feature. The plurality of optional data types includes a first data type selected for the feature in the automatic machine learning process to train the model. The machine learning server 110 may generate a feature list that includes a plurality of features and a description of each feature indicating how important the user is for the prediction. The plurality of features include features used in the automatic machine learning process to train the model. The machine learning server 110 may generate an algorithm list that includes a plurality of algorithm and description of each algorithm that indicates a reason for choosing or not choosing the algorithm for training the model. The algorithms including an algorithm used in the automatic machine learning process to train the model.

The machine learning server 110 provides 540 the representation of the machine learning pipeline for display in a user interface. The user interface allows a user to modify at least some of the decisions made in the automatic machine learning process. For instance, the user interface allows the user to select a new data type for a feature, select a new data imputing method to impute missing values of a feature, edit (e.g., adding, removing, or changing ranking) feature selection made in the automatic machine learning process, select a different algorithm, tune hyperparameters, and so on.

The machine learning server 110 receives 550 one or more modifications from the user through the user interface. The machine learning server 110 refines 560 the model based on the one or more modifications from the user. The refined model is to be used to make the prediction based on new data. For instance, the machine learning server 110 receives a selection of a different data type for a feature and may encode values in the feature based on the different data type.

Figure 6:
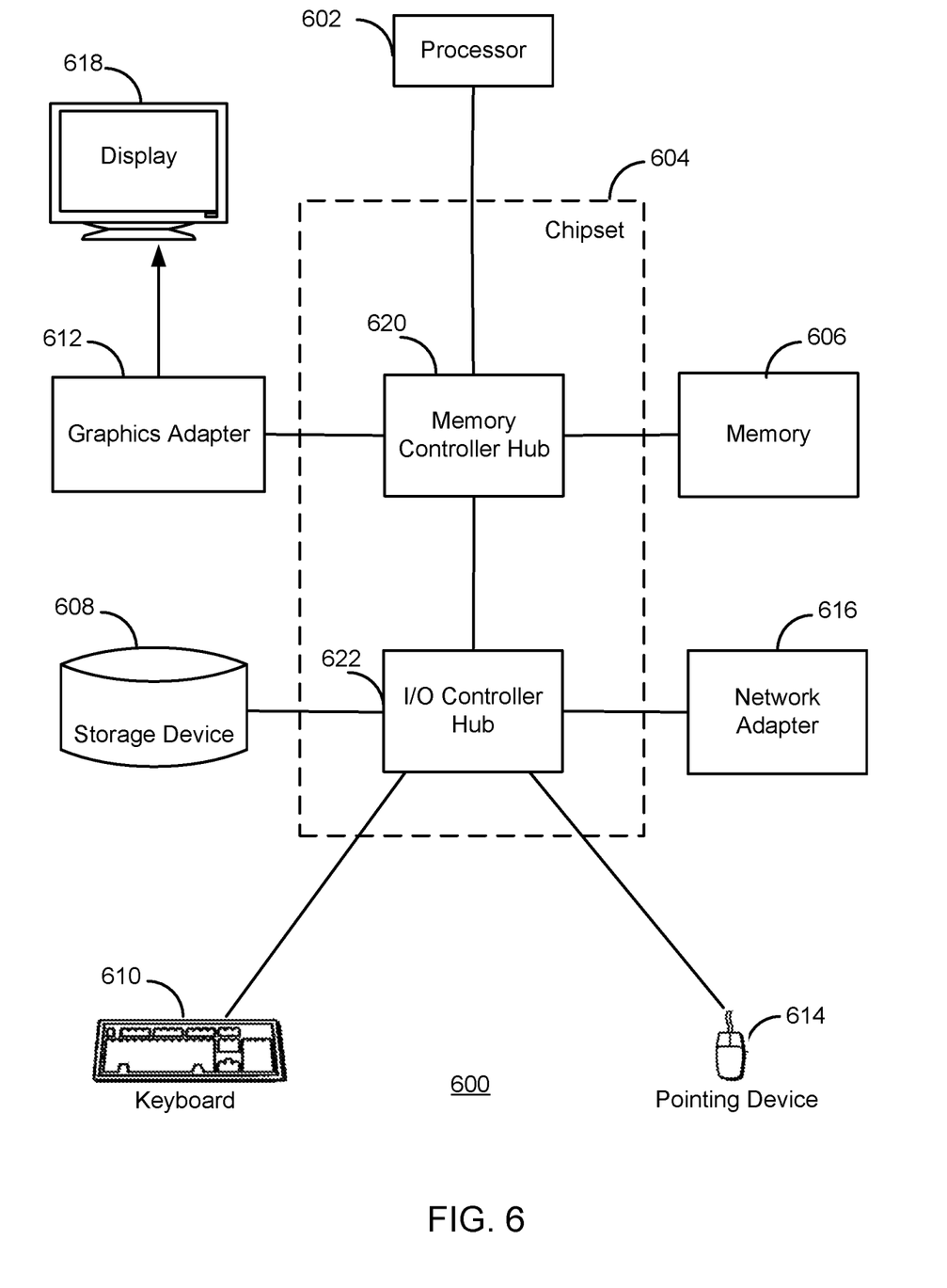
FIG. 6 is a high-level block diagram illustrating a functional view of a typical computer system for use as the machine learning server of FIG. 1 according to an embodiment.

FIG. 6 is a high-level block diagram illustrating a functional view of a typical computer system 600 for use as the machine learning server 110 of FIG. 1 according to an embodiment.

The illustrated computer system includes at least one processor 602 coupled to a chipset 604. The processor 602 can include multiple processor cores on the same die. The chipset 604 includes a memory controller hub 620 and an input/output (I/O) controller hub 622. A memory 606 and a graphics adapter 612 are coupled to the memory controller hub 620 and a display 618 is coupled to the graphics adapter 612. A storage device 608, keyboard 610, pointing device 614, and network adapter 616 may be coupled to the I/O controller hub 622. In some other embodiments, the computer system 600 may have additional, fewer, or different components and the components may be coupled differently.

For example, embodiments of the computer system 600 may lack displays and/or keyboards. In addition, the computer system 600 may be instantiated as a rack-mounted blade server or as a cloud server instance in some embodiments.

The memory 606 holds instructions and data used by the processor 602. In some embodiments, the memory 606 is a random-access memory. The storage device 608 is a non-transitory computer-readable storage medium. The storage device 608 can be a HDD, SSD, or other types of non-transitory computer-readable storage medium. Data processed and analyzed by the machine learning server 110 can be stored in the memory 606 and/or the storage device 608.

The pointing device 614 may be a mouse, track ball, or other type of pointing device, and is used in combination with the keyboard 610 to input data into the computer system 600. The graphics adapter 612 displays images and other information on the display 618. In some embodiments, the display 618 includes a touch screen capability for receiving user input and selections. The network adapter 616 couples the computer system 600 to the network 140.

The computer system 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer-implemented method, comprising:
receiving a dataset;
generating, automatically and independent of user input, a trained machine learning model using the dataset and an automatic modeling application, the trained machine learning model configured to generate an output based on new data;
displaying, in a user interface of a computing device, a representation of a pipeline that depicts a sequence of decisions made by the automatic modeling application while generating the trained machine learning model using the dataset;
displaying, in the user interface, a plurality of controls, each of the plurality of controls corresponding to at least one decision in the sequence of decisions made by the automatic modeling application while generating the trained machine learning model and configured to receive user input modifying the at least one decision;
receiving, via the user interface, user input to at least one of the plurality of controls modifying one or more decisions in the sequence of decisions; and
causing the automatic modeling application to generate a refined trained machine learning model using a modified sequence of decisions that is defined by the user input to the at least one of the plurality of controls.

2. The computer-implemented method of claim 1, wherein the sequence of decisions includes a data preparation decision and the modified sequence of decisions comprises a data type setting step in the data preparation decision that is different from the sequence of decisions used to generate the trained machine learning model.

3. The computer-implemented method of claim 1, wherein the sequence of decisions includes a data preparation decision and the modified sequence of decisions comprises a data encoding step in the data preparation decision that is different from the sequence of decisions used to generate the trained machine learning model.

4. The computer-implemented method of claim 1, wherein the sequence of decisions includes a data preparation decision and the modified sequence of decisions comprises a data imputation step in the data preparation decision that is different from the sequence of decisions used to generate the trained machine learning model.

5. The computer-implemented method of claim 1, wherein the sequence of decisions includes a feature engineering decision and the modified sequence of decisions comprises a feature selection step in the feature engineering decision that is different from the sequence of decisions used to generate the trained machine learning model.

6. The computer-implemented method of claim 1, wherein the sequence of decisions includes a feature engineering decision and the modified sequence of decisions comprises a feature ranking step in the feature engineering decision that is different from the sequence of decisions used to generate the trained machine learning model.

7. The computer-implemented method of claim 1, wherein the sequence of decisions includes a model training decision and the modified sequence of decisions comprises a hyperparameter tuning step in the model training decision that is different from the sequence of decisions used to generate the trained machine learning model.

8. The computer-implemented method of claim 1, wherein the sequence of decisions includes a model training decision and the modified sequence of decisions comprises an algorithm selection step in the model training decision that is different from the sequence of decisions used to generate the trained machine learning model.

9. The computer-implemented method of claim 1, wherein the sequence of decisions includes at least one decision that is selected by the trained machine learning model from a plurality of options and the representation of the pipeline includes a ranking score for each of the plurality of options, wherein the ranking score represents a performance measure of the trained machine learning model resulting from selecting an option for the at least one decision.

10. The computer-implemented method of claim 1, wherein the representation of the pipeline includes a feature list comprising a plurality of features and a description, for each of the plurality of features, indicating an importance of the feature relative to the output generated by the trained machine learning model, wherein the plurality of features include features used by the automatic modeling application to generate the trained machine learning model.

11. A system comprising:
one or more processors; and
a computer-readable storage medium storing instructions that are executable by the one or more processors to perform operations comprising:
receiving a dataset;
generating, automatically and independent of user input, a trained machine learning model using the dataset and an automatic modeling application, the trained machine learning model configured to generate an output based on new data;
displaying, in a user interface, a representation of a pipeline that depicts a sequence of decisions made by the automatic modeling application while generating the trained machine learning model using the dataset;
displaying, in the user interface, a plurality of controls, each of the plurality of controls corresponding to at least one decision in the sequence of decisions made by the automatic modeling application while generating the trained machine learning model and configured to receive user input modifying the at least one decision;
receiving, via the user interface, user input to at least one of the plurality of controls modifying one or more decisions in the sequence of decisions; and
causing the automatic modeling application to generate a refined trained machine learning model using a modified sequence of decisions that is defined by the user input to the at least one of the plurality of controls.

12. The system of claim 11, wherein the sequence of decisions includes a data preparation decision and the modified sequence of decisions comprises at least one of a data type setting step, a data encoding step, or a data imputation step in the data preparation decision that is different from the sequence of decisions used to generate the trained machine learning model.

13. The system of claim 11, wherein the sequence of decisions includes a feature engineering decision and the modified sequence of decisions comprises at least one of a feature selection step or a feature ranking step in the feature engineering decision that is different from the sequence of decisions used to generate the trained machine learning model.

14. The system of claim 11, wherein the sequence of decisions includes a model training decision and the modified sequence of decisions comprises at least one of a hyperparameter tuning step or an algorithm selection step in the model training decision that is different from the sequence of decisions used to generate the trained machine learning model.

15. The system of claim 11, wherein the sequence of decisions includes at least one decision that is selected by the trained machine learning model from a plurality of options and the representation of the pipeline includes a ranking score for each of the plurality of options, wherein the ranking score represents a performance measure of the trained machine learning model resulting from selecting an option for the at least one decision.

16. The system of claim 11, wherein the representation of the pipeline includes a feature list comprising a plurality of features and a description, for each of the plurality of features, indicating an importance of the feature relative to the output generated by the trained machine learning model, wherein the plurality of features include features used by the automatic modeling application to generate the trained machine learning model.

17. A non-transitory computer-readable storage medium storing instructions that are executable by a processing device to perform operations comprising:
receiving a dataset;
generating, automatically and independent of user input, a trained machine learning model using the dataset and an automatic modeling application, the trained machine learning model configured to generate an output based on new data;
displaying, in a user interface, a representation of a pipeline that depicts a sequence of decisions made by the automatic modeling application while generating the trained machine learning model using the dataset;
displaying, in the user interface, a plurality of controls, each of the plurality of controls corresponding to at least one decision in the sequence of decisions made by the automatic modeling application while generating the trained machine learning model and configured to receive user input modifying the at least one decision;
receiving, via the user interface, user input to at least one of the plurality of controls modifying one or more decisions in the sequence of decisions; and
causing the automatic modeling application to generate a refined trained machine learning model using a modified sequence of decisions that is defined by the user input to the at least one of the plurality of controls.

18. The non-transitory computer-readable storage medium of claim 17, wherein the sequence of decisions includes a data preparation decision and the modified sequence of decisions comprises at least one of a data type setting step, a data encoding step, or a data imputation step in the data preparation decision that is different from the sequence of decisions used to generate the trained machine learning model.

19. The non-transitory computer-readable storage medium of claim 17, wherein the sequence of decisions includes a feature engineering decision and the modified sequence of decisions comprises at least one of a feature selection step or a feature ranking step in the feature engineering decision that is different from the sequence of decisions used to generate the trained machine learning model.

20. The non-transitory computer-readable storage medium of claim 17, wherein the sequence of decisions includes a model training decision and the modified sequence of decisions comprises at least one of a hyperparameter tuning step or an algorithm selection step in the model training decision that is different from the sequence of decisions used to generate the trained machine learning model.

\* \* \* \* \*